United States Patent [19]

Belanger

[11] Patent Number: 5,396,680
[45] Date of Patent: Mar. 14, 1995

[54] REPLACEABLE CLOTH ASSEMBLY FOR A CAR WASHING APPARATUS

[75] Inventor: Michael J. Belanger, Walled Lake, Mich.

[73] Assignee: Belanger, Inc., Northville, Mich.

[21] Appl. No.: 107,317

[22] Filed: Jul. 30, 1993

[51] Int. Cl.⁶ .............................................. B60S 3/06
[52] U.S. Cl. .................................. 15/230.16; 15/97.3; 15/230.17; 451/466
[58] Field of Search ............ 15/DIG. 2, 97.3, 230.14, 15/230.15, 230.16, 230.17, 230.19; 51/334, 337, 394

[56] References Cited

U.S. PATENT DOCUMENTS

| | | | |
|---|---|---|---|
| 3,846,942 | 11/1974 | Belanger | 51/334 |
| 4,055,919 | 11/1977 | Belanger | 15/230.19 X |
| 4,183,183 | 1/1980 | Belanger | 15/230.19 X |
| 4,630,408 | 12/1986 | Iding | 15/230.14 |

Primary Examiner—Edward L. Roberts
Attorney, Agent, or Firm—Brooks & Kushman

[57] ABSTRACT

A replaceable cloth assembly is provided having a longitudinally extending plastic welt having a pair of spaced apart flaps for receiving a sheet of car wash fabric therebetween. A series of longitudinally extending fasteners project through the welt flaps and the fabric sheets sandwiched therebetween to securely retain the fabric to the weld. The welt head is sized to be longitudinally inserted in an elongated internal channel formed in the exterior of a support member with the neck portion extending through a narrow slot to position the flaps with the fabric sheet attached thereto outboard of the longitudinal cavity.

11 Claims, 1 Drawing Sheet

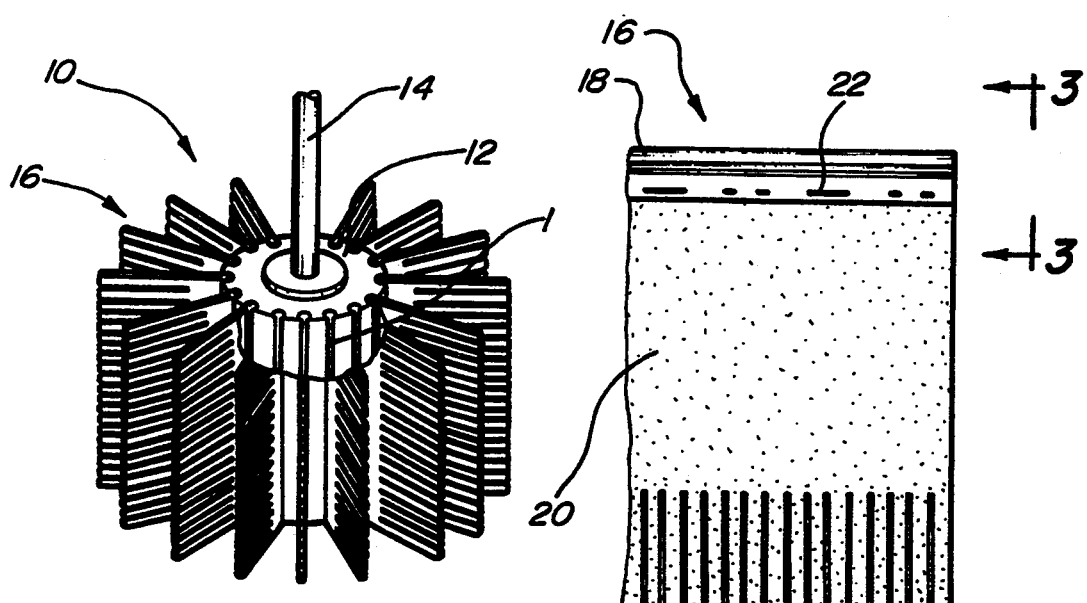
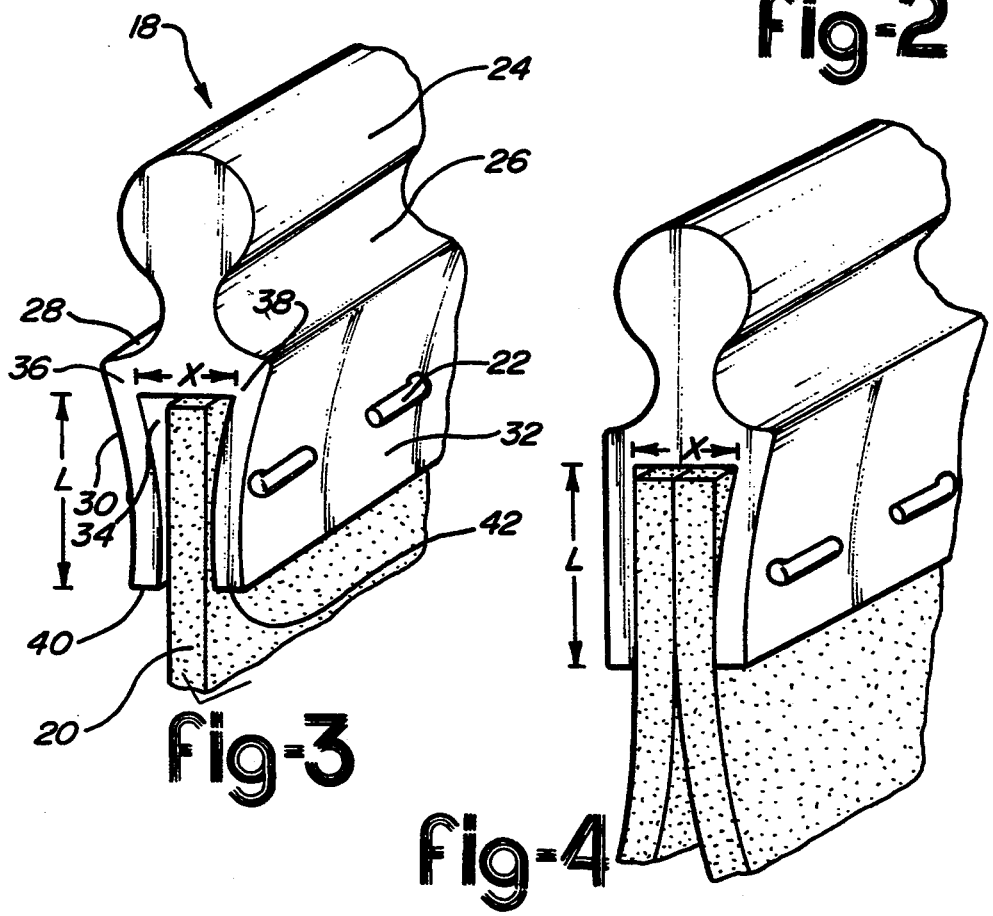

REPLACEABLE CLOTH ASSEMBLY FOR A CAR WASHING APPARATUS

TECHNICAL FIELD

This invention relates to car washes and more particularly, to replaceable cloth assemblies for attachment to a power driven support member.

BACKGROUND ART

Car washes utilizing cloth cleaning wheels and overhead curtains must periodically replace the cloth elements as they become worn. These cloth elements are typically attached to a power driven support structure, such as a cylindrical wheel of a rotary side wheel or an overhead support frame in the case of an oscillating curtain wash. An overhead curtain wash of this type is generally shown in U.S. Pat. No. 4,057,866, Belanger, and a rotary side wheel of this general type is shown in U.S. Pat. No. 4,055,028, Belanger. The replaceable cloth assemblies are attached to longitudinally extending channels formed in the apparatus support structure. The channels have an internal cavity provided with a narrow slot extending outwardly therefrom. The replaceable cloth assemblies longitudinally slide into the cavity and are provided with an enlarged marginal edge to prohibit removal of the fabric transversely through the slot.

The enlarged marginal edge of the fabric can be formed in a number of ways as illustrated in U.S. Pat. No. 4,055,028, FIGS. 3 and 4. An elongated key-hole shaped plastic welt can be sewn into the folded over flap formed in the marginal edge of the fabric sheet to form an enlarged generally cylindrical head. A problem associated with this type of replacement cloth assembly is that the fabric outer coating of the head swells when wet and becomes extremely difficult to remove when replacement is necessary. A replaceable cloth pack assembly shown in U.S. Pat. No. 4,813,183, Belanger, utilizes a plastic head for directly cooperating with the elongated channel in the support member. These plastic heads extend transversely outboard of the channel and attach to a metal clip retaining a cloth pack assembly or in the case of FIG. 9, integrally form a clip designed to retain a pack of a series of overlapping fabric sheets. Replacement cloth assemblies of the type illustrated in the U.S. Pat. No. 4,183,183 patent, are difficult to assemble and are not suitable for supporting a single sheet of fabric.

In an effort to solve these problems, another manufacturer has recently begun to use a single sheet of fabric attached to a generally key-hole shape welt similar to member 138 as shown in FIG. 8 of the U.S. Pat. No. 4,813,183. A single sheet of fabric is sewn directly to the thin planar portion of the welt member. While this cloth assembly is easy to change, it is still very labor intensive to manufacture.

DISCLOSURE OF THE INVENTION

It is an object of the present invention to provide a replaceable cloth assembly for a removable attachment to an elongated cylindrical slot and a support member where the cloth assembly is very thin and includes not more than two overlapping sheets of non-woven material.

It is an object of the present invention to provide a secure junction between the marginal edge of the cloth fabric and the welt which will not fatigue and tear during use.

It is yet another object of the present invention to provide a replaceable cloth assembly for a car washing apparatus which can be easily assembled with a minimum of labor and machine time.

Accordingly, a replaceable cloth assembly of the present invention is provided having a longitudinally extending plastic welt of a substantially uniform cross-section having an enlarged head portion, a relatively smaller neck attached thereto and a pair of spaced apart flaps having a first edge connected to the neck and spaced apart from one another a distance X and a free edge spaced therefrom providing a flap-like L where X falls within the range of 0.4L to 0.6L. Not more than two sheets of overlapping fabric are provided having a longitudinal edge inserted between the spaced apart flaps of the welt. A fastener extending along the longitudinal length of the welt secures the spaced apart flaps together sandwiching the fabric sheet therebetween inwardly deforming the flap free ends into conformity with the fabric, resulting in the flap free ends being spaced apart a distance which is less than 0.8X.

DESCRIPTION OF THE DRAWINGS

FIG. 1 is a partially cut away perspective view of a rotary wheel assembly employing the replaceable cloth assemblies of the present invention;

FIG. 2 is a side elevational view of a replaceable cloth assembly;

FIG. 3 is a perspective end view taken along line 3—3 of FIG. 2; and

FIG. 4 is a perspective end view of an alternative embodiment of the invention.

BEST MODES FOR CARRYING OUT THE INVENTION

FIG. 1 illustrates a car wash apparatus 10 in the form of a rotary wheel typically used in a car wash to wash the vehicle sides. Wheel 10 is made up of a central cylindrical hub 12 having a drive shaft 14 extending therefrom. The outer circumferential surface of hub 12 is provided with a series of longitudinally extending channels 14 having a generally key-hole shape defining an elongated internal cavity and a narrow slot extending outwardly therefrom. This hub structure is similar to that shown in U.S. Pat. Nos. 4,018,014 and 4,055,028, Belanger, both of which are incorporated herein for background purposes.

Mounted on the outer periphery of hub 12 are a series of replaceable cloth assemblies 16. A single cloth assembly 16 is shown in FIG. 2 and the cloth assembly 16 is made up of a welt portion 18. A sheet of car wash fabric 20 and a series of staples 22 which provide fastening means longitudinally extending along the welt and periodically projecting therethrough to secure the fabric to the welt. It should be appreciated that alternative to the stapling, the fabric can be stitched to the welt or other piercing type fasteners such as rivets can be utilized to achieve the desired fastening function.

The welt preferably has a substantially uniform cross-section and most preferably is formed of a plastic extrusion. The cross-sectional end view of the welt as attached to the sheet of fabric is best illustrated with reference to FIG. 3. Welt 18 is provided with an enlarged head portion 24. A relatively narrow neck portion 26 and a shoulder region 28 are attached to the shoulder region of the welt 28 and a pair of spaced apart flaps 30 and 32 which define an elongated slot 34 therebetween are sized to receive fabric sheet 20 therebetween. Flaps 30 and 32 each have fixed ends 36 and 38 respectively, which are affixed to shoulder portion 28 and free ends 40 and 42, respectively, spaced outward therefrom a length L illustrated in FIG. 3. Length L is preferably 10 to 15 mm. and most preferably, approximately 12 mm. Slot 34 has a width X at the region in which flap fixed ends 36 and 38 join shoulder portion 28. Preferably, dimension X falls within the range of 0.4L to 0.6L. X is approximately 5 mm.

A sheet of fabric 20 is inserted between flaps 30 and 32 and held in place with the marginal edge of the cloth fully inserted in the slot and the flaps are then secured together with metal staples longitudinally spaced along the length of the welt. In the FIG. 3 embodiment, a single layer of cloth is utilized and is attached quite satisfactorily, securely utilizing a welt to the present construction. Cloth 20 is of the conventional non-woven synthetic type used widely in the car wash industry. The cloth fabric has a nominal thickness of approximately 2 mm. and can be formed of any number of a variety of synthetic new materials such as polyethylene or polyester or the like.

The preferred staples are formed of a steel wire corrosion resistant coating. The staples have a bight length of approximately 25 mm. and a leg length of approximately 13 mm. prior to installation and deformation. The staples are uniformally spaced along the length of the welt with the staples located approximately 50 mm. apart center to center. The staples are preferably located in the center of the flap, i.e. approximately 0.4L to 0.6L from the flap free ends 40 and 42. When the staples are securely set, flaps 30 and 32 are inwardly deformed causing the flap of the free ends 40 and 42 to conform to the fabric. When the staples are properly installed, flap free ends 40 and 42 should be less than 0.8X apart in the mounting illustrated in FIG. 3. When a single sheet of the fabric is used, flap free ends are 2 to 3 mm. apart. It should be appreciated that the flap free ends will be slightly wavy due to the spacing of the staples, the gap between the free ends being the maximum, midway between the staples and the minimum in the region of the staples deformed ends. This slight variation in spacing between the flap free ends does not adversely affect durability or performance.

FIG. 4 illustrates an alternative embodiment of the invention utilizing an identical welt to the FIG. 3 embodiment, however, two sheets of fabric are inserted therein. The sheets of fabric 52 and 54 have a combined thickness of less than X, approximately 4 mm., enabling the free ends of the welt, when assembled, to be deformed into conformity with the cloth sheets, those being spaced apart a distance less than 0.8X in the region of the staples. By inwardly forming the flaps together, it is achieved in both FIG. 3 and FIG. 4 embodiments. The bending load, which is exerted at the cloth welt interface due to a tangential load on the rotary wheel, is concentrated at the cloth flap free end junction. This design's advantageous results are not readily achieved when more than three sheets of cloth are utilized as the load tends to be formed increasingly more by the interface between the cloth sheet and the staples resulting in premature failure of the assembly at the point of tangent.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed:

1. A replaceable cloth assembly for use in a car washing apparatus having a power driven support member provided with a series of elongated spaced apart longitudinal channels having an elongated internal cavity and a narrow slot extending outwardly therefrom, said replaceable cloth assembly comprising:

a longitudinally extending plastic welt of substantially uniform cross-section, said cross-section defining an enlarged head portion, a relatively smaller neck portion having an end affixed to the head and an opposite end affixed to a pair of spaced apart flaps, each of said flaps having a fixed edge affixed to the neck portion and a free end spaced therefrom providing a flap length L, wherein said flaps each have fixed edges spaced apart from one another a distance X defining a slot therebetween where X falls within the range of 0.4L to 0.6L, said welt being sized to be longitudinally inserted into the support member channel with the neck extending through the narrow slot with said head within the interior cavity, said head being sufficiently large to prevent removal from the interior cavity through the channel slot;

a sheet of car wash fabric having a longitudinal edge inserted between the spaced apart flaps of the welt; and fastening means longitudinally extending along the welt and periodically projecting through the spaced apart flaps and the fabric sheet sandwiched therebetween inwardly deforming the flap free ends into conformity with the fabric resulting in the flap free ends being spaced apart a distance less than 0.8X thereby securely retaining the fabric to the welt.

2. The replaceable cloth assembly of claim 1 wherein said welt is generally symmetrical about a central transverse plane which extends between the spaced apart flaps and bisects the welt head and neck portions.

3. The replaceable cloth assembly of claim 2 wherein said pair of spaced apart flaps are generally parallel to one another and said transverse plane.

4. A replaceable cloth assembly of claim 1 wherein said distance X falls within the range of 3–7 mm.

5. The replaceable cloth assembly of claim 4 wherein said sheet of car wash fabric further comprises a single layer of non-woven synthetic material having a thickness falling within the range of 1–3 mm.

6. The replaceable cloth assembly of claim 1 wherein said sheet of car wash fabric comprises not more than 2 layers of fabric sheet having overlapping longitudinal edges with a combined thickness of not more than 5 mm.

7. The replaceable cloth assembly of claim 1 wherein said welt is formed of PVC.

8. The replaceable cloth assembly of claim 1 wherein said fastening means comprises a series of generally U-shaped staples.

9. The replaceable cloth assembly of claim 8 wherein said staples are located a distance 0.4L to 0.6L from the flap free end.

10. A replaceable cloth assembly for use in a car washing apparatus having a power driven support member provided with a series of elongated spaced apart longitudinal channels having an elongated internal cavity and a narrow slot extending outwardly therefrom, said replaceable cloth assembly comprising:

a longitudinally extending extruded plastic welt of substantially uniform cross-section, said cross-section defining an enlarged head portion, a relatively smaller neck portion having an end affixed to the head and an opposite end affixed to a pair of spaced apart flaps, each of said flaps having a fixed edge affixed to the neck portion and a free end spaced therefrom providing a flap length L, wherein said flaps each have fixed edges spaced apart from one another a distance X defining a slot therebetween where X falls within the range of 0.4L to 0.6L, said welt being sized to be longitudinally inserted into the support member channel with the neck extending through the narrow slot with said head within the interior cavity, said head being sufficiently large to prevent removal from the interior cavity through the channel slot;

a single layer sheet of car wash fabric having a longitudinal edge inserted between the spaced apart flaps of the welt; and a series of staples longitudinally spaced apart and extending along the length of the welt and periodically projecting through the spaced apart flaps and the fabric sheet sandwiched therebetween inwardly deforming the flap free ends into conformity with the fabric resulting in the flap free ends being spaced apart a distance less than 0.8X thereby securely retaining the fabric to the welt.

11. The car wash apparatus comprising:

a support member having an elongated body provided with a series of elongated spaced apart longitudinal channels each having an internal cavity and a relatively narrow slot extending outwardly therefrom, the support member provided with an input for moving the support member relative to a vehicle to be cleaned by the apparatus; and a plurality of replaceable cloth assemblies affixed to and cooperating with the longitudinal channels of said support member, each replaceable cloth assemblies having;

a replaceable cloth assembly for use in a car washing apparatus having a power driven support member provided with a series of elongated spaced apart longitudinal channels having an elongated internal cavity and a narrow slot extending outwardly therefrom, said replaceable cloth assembly comprising:

a longitudinally extending plastic welt of substantially uniform cross-section, said cross-section defining an enlarged head portion, a relatively smaller neck portion having an end affixed to the head and an opposite end affixed to a pair of spaced apart flaps, each of said flaps having a fixed edge affixed to the neck portion and a free end spaced therefrom providing a flap length L, wherein said flaps each have fixed edges spaced apart from one another a distance X defining a slot therebetween where X falls within the range of 0.4L to 0.6L, said welt being sized to be longitudinally inserted into the support member channel with the neck extending through the narrow slot with said head within the interior cavity, said head being sufficiently large to prevent removal from the interior cavity through the channel slot:

a sheet of car wash fabric having a longitudinal edge inserted between the spaced apart flaps of the welt; and fastening means longitudinally extending along the welt and periodically protecting through the spaced apart flaps and the and the fabric, sheet sandwiched therebetween inwardly deforming the flap free ends into conformity with the fabric resulting in the flap free ends being spaced apart a distance less than 0.8X thereby securely retaining the fabric to the welt.

\* \* \* \* \*